Dec. 14, 1943.    G. A. VAIPAN    2,336,971
LEVER ACTION TABLE SAW SET DEVICE
Filed July 8, 1942    2 Sheets-Sheet 1
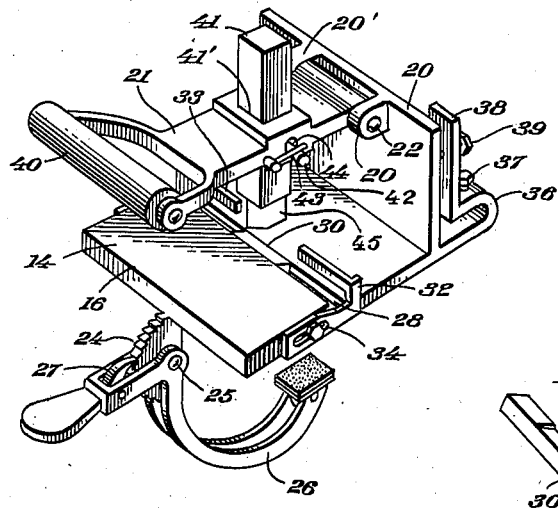
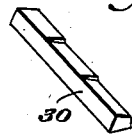
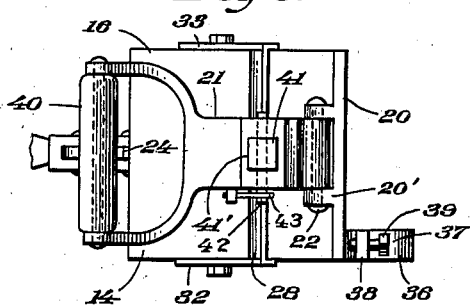
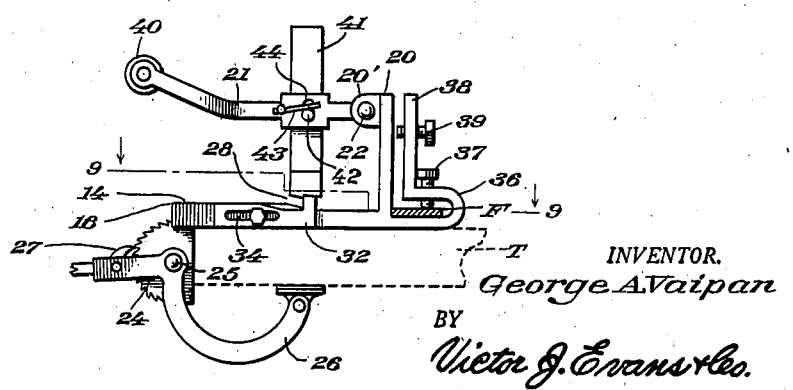
INVENTOR.
George A. Vaipan
BY
Victor J. Evans & Co.
ATTORNEYS Dec. 14, 1943. G. A. VAIPAN 2,336,971
LEVER ACTION TABLE SAW SET DEVICE
Filed July 8, 1942  2 Sheets-Sheet 2
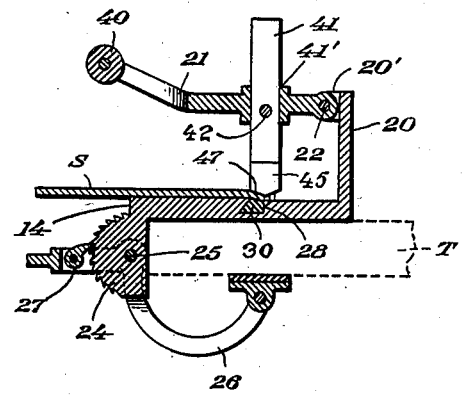
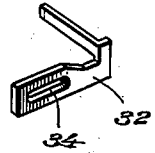
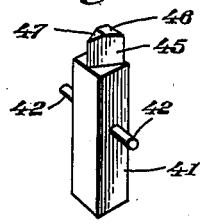
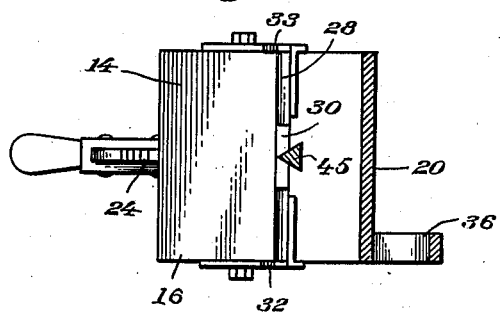
INVENTOR.
George A. Vaipan
BY
Victor J. Evans & Co.
ATTORNEYS Patented Dec. 14, 1943

2,336,971

UNITED STATES PATENT OFFICE 2,336,971

LEVER ACTION TABLE SAW SET DEVICE

George A. Vaipan, Tyonek, Territory of Alaska

Application July 8, 1942, Serial No. 450,166

6 Claims. (Cl. 76—63)

This invention relates to improvements in a lever action table saw set device.

One object of the invention is to provide means whereby the teeth of a saw may be uniformly set by a gradually applied pressure as distinguished from the sharp blow of a hammer so often used. To facilitate this operation, I have provided that the setting member proper is formed as a part of, or secured to, a lever which is pivoted at a considerable distance from the point of pressure application, so that, as pressure is applied thereto, there is a sliding movement which tends to move the metal of the tooth into a gradual curve as distinguished from a sharp angular displacement.

Another object of the invention is to provide a saw setting device having a pivotally mounted setting plunger, movable in an arcuate path while in contact with the saw tooth, so that it will have a slight drawing or sliding movement relative to the saw tooth as it is being pressed down on the saw tooth, whereby the danger of breaking the tooth will be eliminated.

A further object of the invention is to provide a novel clamping arrangement for saws having small teeth, said clamping means being arranged to position the saw accurately while the teeth are being set, and said clamp consisting of an adjustable gauge member.

A still further object of the invention is to provide a simple and effective saw set which can be cheaply manufactured and having certain details of structure and combination of parts hereinafter more fully set forth.

In the accompanying drawings—

Figure 1 is a perspective view of my improved saw setting device.

Figure 2 is a perspective view of the improved anvil used in my saw setting device.

Figure 3 is a top plan view of Figure 1.

Figure 4 is an end elevation of the device showing the supporting table in dotted lines.

Figure 5 is an end elevation, partly in section to illustrate more fully in detail certain parts.

Figure 6 is a perspective view showing one of my improved gauge bars.

Figure 7 is a perspective view of another form of anvil used with my device.

Figure 8 is an inverted perspective view of the setting plunger.

Figure 9 is a cross sectional view, taken on the line 9—9 of Figure 4.

Referring to the drawings, the base 14 is provided normally with an under-cut groove at 28, into which is slidably placed anvil member 30. This member is made after the showing of Figures 2 and 7, and preferably provides for a plurality of beveled faces disposed to form different angles with respect to rest portion 16, of the base; and in this manner varying sets may be given to the saw; it being understood that a wide variety of members 30 might be used having angles so formed as to provide any desirable bevel for creating the set desired in the saw.

As a gauge to provide definite placement of the saw on the rest portion 16, I provide the coacting guage members 32 and 33. These members are preferably secured to the base 14 by a sliding connection, indicated at 34, so that they can be adjustably positioned to place the saw teeth at the point desired, and are preferably positioned, as shown in Figures 1, 3 and 4, so that they form a retaining means for the anvil member 30.

The rear edge of the base 14 is provided with an integral upwardly extending wall 20, forming a bracket. The upper end of the wall 20, at the center, is provided with inwardly extending spaced ears 20', in which is mounted a pivot 22, upon which the lever 21 swings, as fully shown in Figures 1, 3 and 4 of the drawings. The forward, or rest portion 16, of the base 14, is provided with a downwardly extending ratchet member 24 which forms a part of the base and provides a mounting for the pivot pin 25, about which the slotted clamp arm 26 is positioned to oscillate. The clamp member 26 is held in adjusted position by the pawl member 27, whereby the device is clamped to the table T, shown in dotted lines in Figure 4. This clamping means is specifically covered by an application, Serial No. 450,210, filed of even date herewith.

The rear portion of the base 14 is provided with an outwardly extending clamp portion 36, which has a clamp screw 37, so that a file F may be clamped in a horizontal position for jointing the teeth in the saw. This portion 36 is provided with a vertical portion 38, having a lock screw 39. This specific construction for jointing the saw is covered by an application, Serial No. 450,167, filed of even date herewith.

The lever 21, as shown in Figures 1, 3 and 4 of the drawings, is provided at its outer end with a suitable handle 40, and intermediate the handle and the pivot 22 it is provided with a setting plunger 41. The plunger 41 is preferably of square form and passes through a square socket 41' arranged in the lever 21. While I have shown the plunger 41 square, it will be understood that the same can be of any angular form, with a corresponding socket, in order to prevent the turning of the plunger. The plunger 41 is provided with a transverse pin 42, which passes through vertical slots 44 in opposite sides of the socket, whereby the plunger has a limited movement independent of the lever. In order to hold the plunger 41 in its downward position in the slots 44, I have provided the spring 43, carried by opposite sides of the socket, and which have their outer ends bearing on the upper faces of the pin. The plunger 41, at its lower end, is provided with a reduced portion 45, which is preferably wedge shape in cross section and has a flat lower end 46 and the beveled portion 47, said beveled portion having a wedge shaped surface adapted to engage the saw tooth.

The setting of the saw teeth is accomplished by laying the saw S, with the flat side on the rest portion 16. The saw is then moved rearwardly until the teeth engage the members 32 and 33, as clearly shown in Figure 5 of the drawings. The saw is then in position and the tooth to be set is placed directly under the beveled face 47 of the plunger 41. The lever 21 is then swung to the left, as shown, and pressed downwardly until the setting operation is accomplished. It will be noted that the pivot 22, of the lever 21, is a considerable distance above the rest portion 16, of the base, whereby the plunger 41 in its downward movement travels through an arc of a circle. This causes a distinct wiping action of the beveled portion 47 of the plunger on the tooth and gradually curves the tooth in its downward movement. By this structure, it will be seen that there will be no abrupt angles to the saw tooth.

What I claim is:

1. A saw setting device comprising a base, an anvil member on said base positioned to receive a saw tooth to be set, a lever pivoted to said base above and rearwardly of said anvil member, a saw tooth engaging die member carried by the lever to engage with a saw tooth on said anvil member and movable in an arcuate path when it engages said tooth, laterally extending pins projecting from opposed sides of the die member and passing through vertical slots in the lever, and spring means for holding the pins in the lower ends of the slots.

2. A saw setting device comprising a base, an anvil member on said base positioned to receive a saw tooth to be set, a lever pivoted to said base at a point rearwardly of said anvil member, gage members carried by the base and adapted to position the saw in respect to the anvil member and to hold said anvil member in position, a rectangular socket on the lever above the anvil member and having vertical slots in the opposite walls, a saw tooth engaging die passing through the socket and provided with pins on opposite sides passing through the slots, and spring means carried by the socket and engaging the outer ends of the pins for holding the same in the lower ends of the slots.

3. A saw setting device comprising a base, an anvil member on said base positioned to receive a saw tooth to be set, a moveable gauge member positioned to engage a saw tooth to be set, a lever pivoted to said base above and rearwardly of said anvil member, the said lever having aligned slots in opposed sides thereof, a saw tooth engaging plunger carried by the lever to engage with a saw tooth on said anvil member and moveable in an arcuate path when it engages said tooth, a laterally extending pin on each of two opposed sides of the plunger projecting through the slots in each side of the lever and spring means mounted on the lever for holding the pin in the lower ends of the slots.

4. A saw setting device comprising a base, an undercut groove, an anvil, a moveable gauge member, an upright support member, a lever arm pivoted to said support, a square hole in said lever arm member, horizontal hole that forms a vertical slot through the square vertically shaped hole, a square reversible co-operating setting plunger placed through the square hole of said lever arm member, a moveable pin member placed through the hole or slots of said lever arm member and through the hole of said plunger will hold the plunger firmly in said lever arm member, a mounted spring means on the lever arm member engaging the outer ends of the pin for holding the same in the lower ends of the slots.

5. A saw setting device comprising a base frame having an upright back wall and an undercut groove in front of the wall in the base, an anvil member secured in the groove positioned to receive a saw tooth to be set, a pair of aligned arms having angular slotted attaching plates and bolts securing said plates to the sides of the base frame, a hand lever having an elevated pivoted support on the wall, the said lever having a square hole formed transversely therethrough, a plunger square in cross section slidably fitted in the hole of the lever, the said lever having an elongated slot in each side in registration with the hole therethrough, a pin projecting laterally from opposed sides of the plunger and extending through the slots in the lever, and spring means mounted on each side of the lever bearing on the said pins for resiliently urging the pins to downward positions in the slots.

6. In a saw setting device, a base, a lever pivotally mounted on the base having a non-circular opening transversely through its medial portion, the said medial portion of the lever having a slot in each side elongated transversely of the lever, a pin projecting laterally from each side of the plunger and extending through the slot in the lever, and a spring secured to each side of the lever bearing on the plunger pin to resiliently urge the pin to downward position in the slot.

GEORGE A. VAIPAN.